(12) United States Patent
Damsi

(10) Patent No.: US 8,235,447 B2
(45) Date of Patent: Aug. 7, 2012

(54) TENSIONING AND LOCK DEVICE

(75) Inventor: Everest Damsi, Waterdown (CA)

(73) Assignee: Roll-Tite Corp., Brantford, Ontario (CA)

( * ) Notice: Subject to any disclaimer, the term of this patent is extended or adjusted under 35 U.S.C. 154(b) by 10 days.

(21) Appl. No.: 12/700,125

(22) Filed: Feb. 4, 2010

(65) Prior Publication Data

US 2011/0187148 A1 Aug. 4, 2011

(51) Int. Cl.
*B60P 7/04* (2006.01)

(52) U.S. Cl. ......... 296/100.15; 296/100.12; 296/100.16; 296/100.18

(58) Field of Classification Search ............. 296/100.04, 296/100.07, 100.11, 100.12, 100.15, 100.16, 296/100.18, 143

See application file for complete search history.

(56) References Cited

U.S. PATENT DOCUMENTS

| | | | |
|---|---|---|---|
| 4,342,480 A * | 8/1982 | Ross, Jr. ................... | 296/100.12 |
| 5,152,575 A | 10/1992 | DeMonte et al. | |
| 5,538,313 A * | 7/1996 | Henning .................. | 296/100.12 |
| 6,511,117 B1 * | 1/2003 | Henning .................. | 296/100.15 |
| 6,616,211 B2 * | 9/2003 | Cramaro .................. | 296/100.15 |
| 6,905,161 B2 * | 6/2005 | Fliege et al. ............. | 296/100.18 |
| 7,854,465 B2 * | 12/2010 | LeBlanc et al. .......... | 296/100.01 |
| 2010/0078136 A1 * | 4/2010 | Beshiri et al. ............. | 160/293.1 |

* cited by examiner

*Primary Examiner* — Jason S Morrow
(74) *Attorney, Agent, or Firm* — Scully, Scott, Murphy & Presser, P.C.

(57) ABSTRACT

The present invention is directed to a tensioning and lock device for achieving a sufficient amount of tension throughout a tarp cover. The present invention is particularly well suited for retractable, tarp cover systems used in the trucking industry, but is also useful in other applications and in other fields. The tensioning and lock device comprises a base and an extending mechanism comprising an actuator. The actuator may be of the hydraulic, pneumatic, or mechanical variation and can be either manually or automatically powered. The present tensioning device is lightweight, compact, easy to install and accomplishes its function in a minimal amount of time.

8 Claims, 4 Drawing Sheets

TENSIONING AND LOCK DEVICE

FIELD

The present invention relates to tarpaulin cover systems, and in particular to a tensioning and locking device for producing and maintaining a sufficient amount of tension throughout a tarp cover.

BACKGROUND

Tarpaulin cover systems are commonly used to cover cargo being transported by truck, train, ship, and other vehicles. It is often desirable to cover cargo to protect it from the elements. It may also be desirable to shield the cargo from view.

Cargo that is to be transported may be positioned directly on a vehicle, such as on a truck or trailer bed, or on a rail car. Alternatively, the cargo may first be positioned on a shipping base, such as a shipping or cargo pallet. The shipping base may then be placed on or in the vehicle for transport. The term "base structure" will hereinafter be used to refer to both vehicles and shipping bases. In either instance, it is often desirable to cover the cargo being transported.

Tarpaulin cover systems are particularly common in the trucking industry. One type of shipping configuration comprises a fully enclosed and rigid cargo area. Most of these cargo areas have one or more doors in the enclosure for loading and unloading the cargo. In particular, many trucks or trailers have an opening at their rear end for this purpose. However, such fully enclosed and permanent cargo areas are not well suited for the loading and unloading of certain types of cargo. For example, very large or very heavy items are most easily loaded onto a vehicle, trailer, or base from the top or the side using a crane, forklift or other lifting device. Therefore such large or heavy items are more easily loaded onto a vehicle, trailer, or base having no sidewalls or no roof. Flatbed trucks and trailers are well adapted to carry such loads. However, as discussed above, it is often desirable to cover the loaded cargo during transport, as well as during storage. Tarpaulin cover systems provide an attractive solution as they can be quickly and easily retracted or removed to expose the entire cargo area during loading.

Tarpaulin cover systems are known in the art. For example, flexible tarpaulin systems for highway trailers have been disclosed in U.S. Pat. No. 5,152,575 to DeMonte et al., U.S. Pat. No. 5,538,313 to Henning, and U.S. Pat. No. 6,511,117 to Henning.

Retractable tarpaulin systems can come in a flat-top style, as taught by the two Henning patents, or in a peaked style, as taught by DeMonte. An increasingly common style of flexible cover system comprises a plurality of bows that support a flexible cover. The bows, and thus the cover, are moveable, typically along the length of the base or vehicle, and may be retracted in an accordion-like manner to expose a cargo area. The lower ends of each bow typically comprise sliding means, such as one or more wheels or rollers, which ride in or on a pair of tracks or rails on the base or vehicle.

It is important that the tarpaulin cover in retractable bow-style cover systems be fully stretched-out when the cover is in the extended position. In other words, it is important that tension be maintained in the tarp cover system. This is particularly significant for cover systems that are exposed to high winds or fast-moving air, such as cover systems positioned on vehicles. Firstly, applying and maintaining tension in the cover reduces the severity of flapping in the cover caused by the passing air or wind. A reduction in flapping reduces the material fatigue in the cover and in the bows, and therefore prolongs the service life of these parts. A reduction in flapping also reduces the amount of noise emitted and provides for a quieter ride. Secondly, a taut cover reduces the aerodynamic drag of the cover system. This likely increases the fuel or energy economy of the vehicle transporting the cover system. For the aforementioned reasons, it is desirable to have a satisfactory and substantially uniform tension in the flexible cover.

Tensioning devices and systems for sliding systems covers are also known in the art. Many existing systems involve the application of a force to the front-most or rear-most bow in order to fully stretch out the cover. For example, one such system is disclosed in U.S. Pat. No. 6,616,211 to Cramaro, which uses a crank and a lever that are connected to rear-most bow of the moveable tarpaulin framework. The crank is first rotated to move the lever into a catch position, and then counter-rotated to further extend the framework, which in turn stretches-out the cover.

However, known systems such as the one disclosed by Cramaro suffer from a number of shortcomings. In particular, the tensioning force applied in many existing systems is applied to a front-most or a rear-most bow at the lower ends of the bow. As a result, a satisfactory degree of tension can be applied and maintained in the lower side portions of the cover. However, the resultant tension in the upper side portions and the top portion of the cover will be lower than the tension achieved in the lower side portions. This difference can be at least partially attributed to the flexibility of the parts of the covering system, and in particular of the front-most or rear-most bow.

Existing tensioning devices and systems suffer from further shortcomings. Many systems are heavy or bulky, or both, and are therefore difficult to install and operate. Some systems are inefficient in that they require a significant amount of physical effort or time to achieve the desired degree of tension in the cover.

For the foregoing reasons, it can be appreciated that a need exists for a tarp tensioning and locking device that produces a satisfactory amount of tension in the entire cover, including the side portions and top portion of the cover. It is also desirable that the device be compact, lightweight, and easy to use.

SUMMARY

The present disclosure provides a tarp tensioning and locking device that addresses the problems described above. In particular, the present invention is directed to a sliding tarpaulin tensioning and locking device for achieving a sufficient amount of tension throughout a flexible cover and locking the tensioning in that position. The tensioning and lock device of the present invention comprises a base and an extending mechanism comprising an actuator. The actuator may be of the hydraulic, pneumatic, or mechanical variation and can be either manually or automatically powered. The device is lightweight, compact, easy to install and accomplishes its function in a minimal amount of time. Furthermore, the present invention is particularly well suited for retractable, flexible cover systems used in the trucking industry, but is also useful in other applications and in other fields.

In one aspect, the present disclosure is directed to a tarp tensioning and locking device comprising a base; and an extending mechanism for applying a tensioning force to a tarp, the extending mechanism being pivotally connected to the base, the extending mechanism comprising a bar and an actuator for extending or retracting the bar.

BRIEF DESCRIPTION OF THE DRAWINGS

The present disclosure will be better understood having regard to the drawings in which.

DETAILED DESCRIPTION

The present tarp tensioning and locking device is described in one embodiment in the following disclosure with reference to the Figures. While this embodiment is described in the context of a sliding cover system installed on a flatbed trailer, the scope of the present disclosure is not intended to be limited to sliding cover systems on flatbed trailers. The present tarp tensioning device can be used in other applications and in other fields, including but not limited to tarp systems installed on other vehicles such as trains and ships, and tarp systems installed on separate shipping bases (i.e. not directly installed on a vehicle).

To provide a degree of background to the present invention, a known sliding tarp cover system is now described with reference to the Figures.

Figure 1:
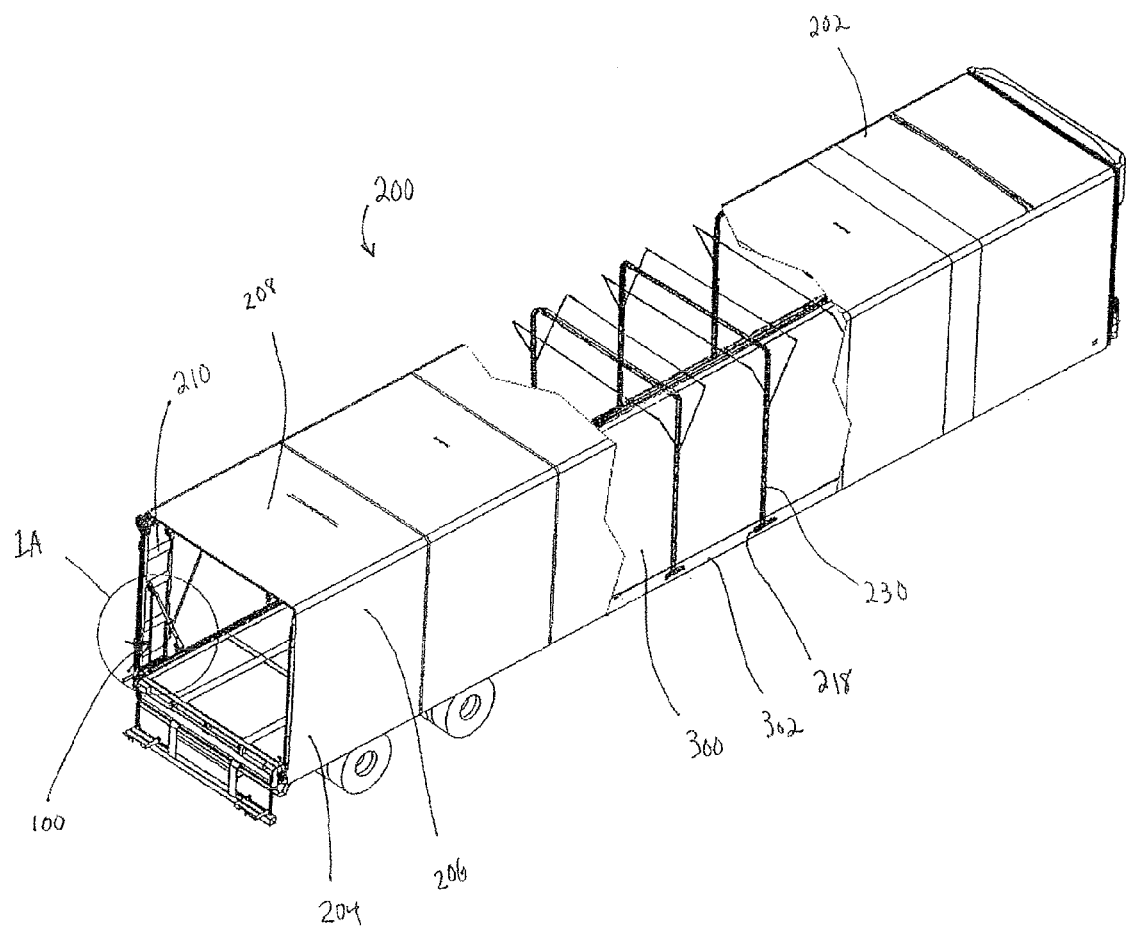
FIG. 1 is a perspective view of a flatbed trailer comprising a sliding tarp cover system and one embodiment of the cover tensioning device.
Figure 1A:
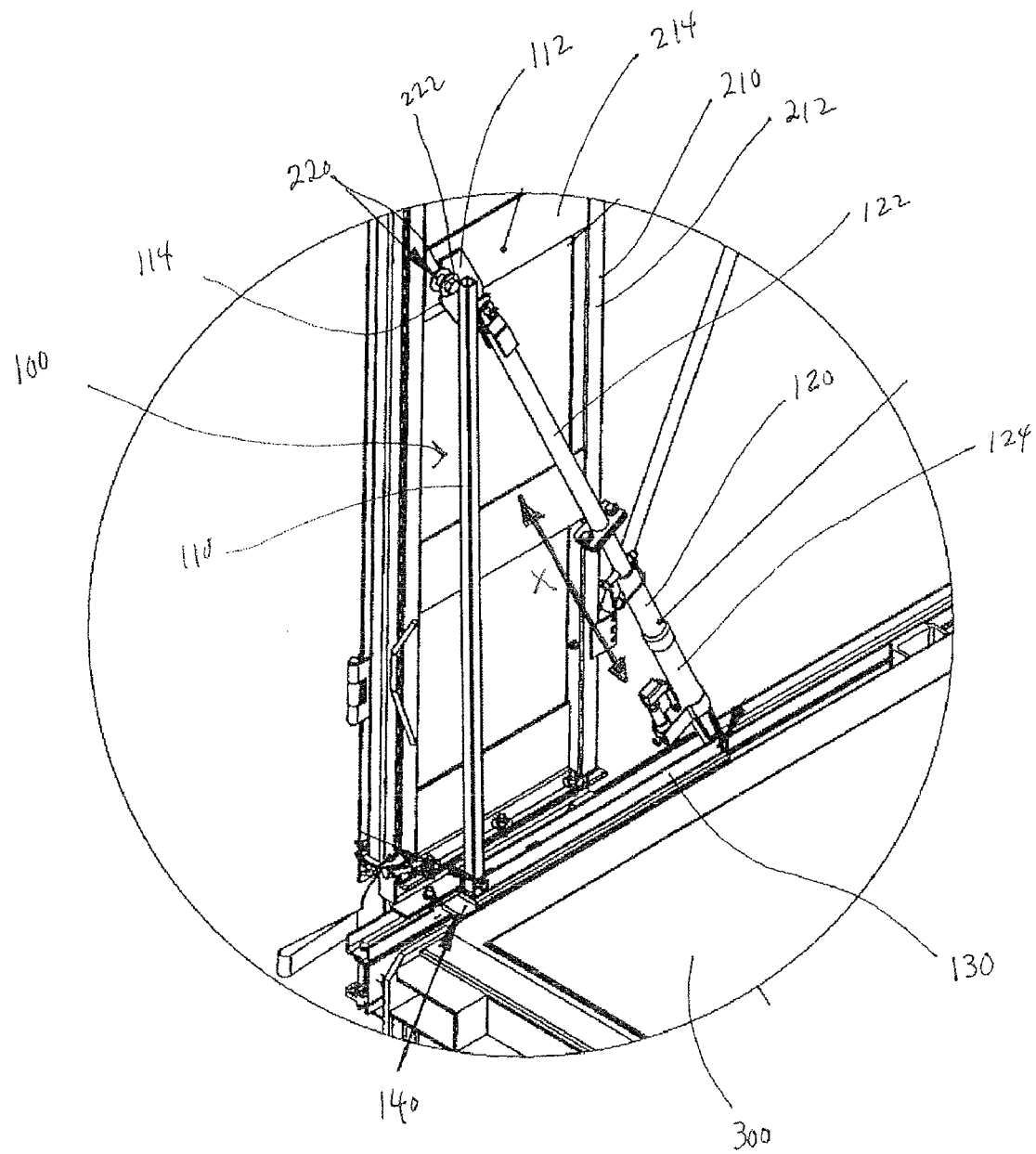
FIG. 1A is an enlarged view of inset 1A shown in FIG. 1.

FIG. 1 shows a flexible cover system 200 installed on a base structure 300, in this case a flat bed trailer. This cover system is shown in its extended (i.e. tightened) position. A tarp cover 202 is supported by a plurality of support members, or "bows", over the trailer bed 300 thereby defining an enclosed cargo area. The sliding tarp system can comprise end bows at the front and rear, such as a rear bow 210, and can also comprise one or more intermediate bows 230. The end bows, such as rear bow 210, may be of a more rigid construction to support the end loads of the tarp 202. For example, as best shown in FIG. 1A, the rear bow 210 can comprise a pair of vertical support members 212 joined by braces 214. The lower ends of each bow are slidably connected to the trailer bed 300 by way of a known wheel system. The slidable connection of the bows to guide members, such as tracks or rails 302, enables the longitudinal movement of the bows along the length of the trailer 300. The slidable connection may be formed by connecting one or more wheels 218 to the ends of a bow, each wheel riding in a track 302 positioned along an edge of the trailer 300.

When the time comes to expose the cargo area of the trailer, the tarp cover 202 and plurality of bows 210, 230 are moved towards one end of the trailer, usually the front end. The tarp cover 202 thereby collapses in an accordion-like manner. When the tarp 202 is to be moved into its extended position, the cover 202 and bows 210, 230 are moved towards the opposite end of the trailer 300, typically the rear end.

The various features and components of the present cover tensioning and locking device are now described.

Figure 2:
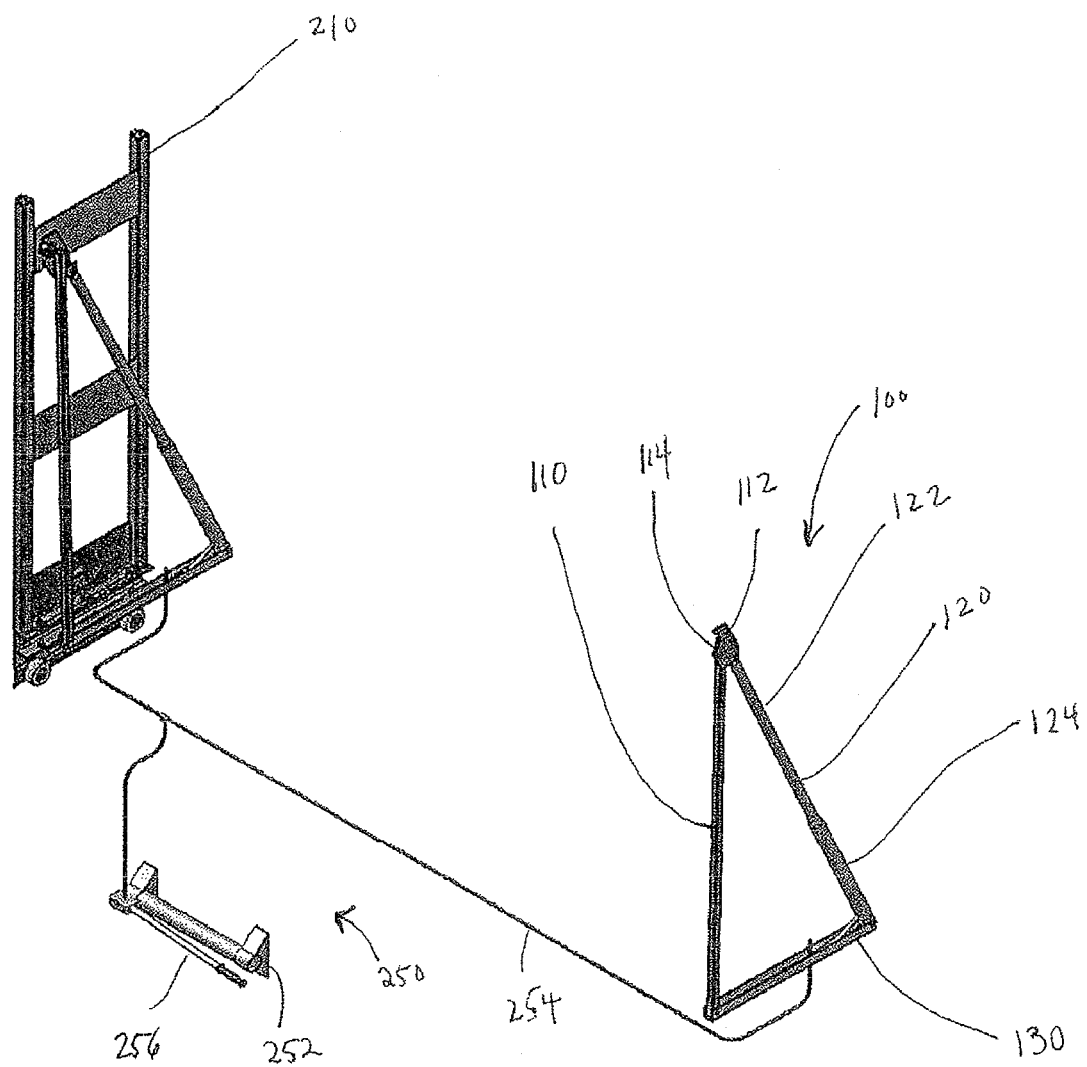
FIG. 2 is a perspective view of a pair of cover tensioning devices.

As shown in FIGS. 1A and 2, in at least one embodiment, the tensioning and lock device 100 of the present invention comprises an extending mechanism 120 and a base 130. The device 100 may also comprise a vertical support 110. It should be noted that FIG. 2 shows a pair of tensioning and lock devices 100, which can be used in tandem.

In at least one embodiment comprising a vertical support, the vertical support 110, extending mechanism 120, and base 130 can be arranged in a triangular formation. The lower ends of both the vertical support 110 and the extending mechanism 120 are pivotally connected to the base 130 at spaced apart points on the base 130. Furthermore, the upper ends of the vertical support 110 and the extending mechanism 120 can be pivotally connected to one another, or to a common connection member, such as an engagement member 112.

The tensioning device 100 may be built to restrict the movement of the extending mechanism 120, as well as a vertical support 110, to a single plane of motion. This would prevent any unnecessary side-to-side movement of the extending mechanism 120 and vertical support 110.

Vertical support 110 can serve as a guide and support for the extending mechanism 120. In effect, the vertical support 110 directs the force exerted by the extending mechanism 120 in the desired direction to apply tension in the tarp cover 202. In the embodiment illustrated in the Figures, the desired direction is towards the rear of the trailer and is substantially parallel to the longitudinal axis of the trailer. This direction is indicated by arrow Y in FIG. 3. The application of force in this direction will fully extend the cover system 200 and will produce tension in the tarp cover 202.

As best illustrated in FIG. 1A, the tensioning system 100 can comprise an engagement member 112 for engaging the cover system 200. The engagement member 112 can be connected to or formed integrally with the upper end of the extending mechanism 120. In at least one embodiment, the engagement member 112 is adapted to engage a bow, such as rear bow 210. For example, in the embodiment shown in FIG. 1A, the engagement member 112 can comprise a recess or notch 114 for engaging a mechanical obstruction, such as a pin 220, on the bow. The pin 220 can comprise a stop member 222 at its distal end to prevent the engagement member 112 from slipping off of the pin 220 when force is applied to the pin 220 by the tensioning device 100. The engagement member 112 can further comprise securing means to releasably secure it to the cover system 200, including but not limited to a clip, a clamp, and any other suitable type of fastener.

The relative height at which the tensioning device 100 applies force to a bow, such as the rear bow 210, is an important consideration. In particular, the relative height at which the extending member 120 applies the tensioning force to the tarp 202, or the rear bow 210, should not be overlooked. It is desirable to obtain a satisfactory and substantially uniform amount of tension in all areas of the tarp cover 202, which includes lower and upper side portions 204, 206 and the top portion 208 (see FIG. 1). One way to achieve a satisfactory and substantially uniform degree of tension in the tarp cover 202 is to position the upper end of the extending mechanism 120 such that it exerts a tensioning force at approximately the vertical midpoint of the tarp cover 202 or rear bow 210. The embodiment of the tensioning device 100 shown in FIG. 1 has such a configuration. Such a configuration should provide a satisfactory and substantially uniform amount of tension in the lower and upper side portions 204, 206 of the cover as well in the top portion 208. However, if the extending mechanism 120 engages the cover 202 or rear bow 210 at too low of a height, then the degree of tension in the upper side portions 206 and the top portion 208 of the cover 202 may be inadequate. Likewise, if the extending mechanism 120 engages the cover 202 or rear bow 210 at too high of a height, then the degree of tension in the lower side portions 204 of the cover 202 may be inadequate.

The extending mechanism 120 comprises a rigid extension member, such as a bar 122, and also comprises an actuator 124. The actuator 124 is connected to the bar 122, and selectively extends and retracts the bar 122 in the directions indicated by arrow X (see FIG. 1A).

The actuator 124 can be powered either manually (e.g. by hand) or automatically (i.e. by another energy source), and should be capable of producing a sufficient amount of force to obtain satisfactory amount of tension in the tarp cover 202. In addition, it is very important that the actuator 124 be capable of entering a locked state, in which any further extension or retraction of the bar 122 is resisted. When a plurality of tensioning devices 100 are used together, the actuators 124 of each device can be powered individually or collectively. As best shown in FIG. 2, in at least one embodiment the actuator 124 is a hydraulic cylinder, which is part of a manually powered hydraulic system 250. The hydraulic cylinder is fluidly connected to a master cylinder 252 by hydraulic line 254. The master cylinder 252 can comprise a handle 256 for manual operation.

As mentioned above, FIG. 2 shows a pair of tensioning and lock devices, which can be used in tandem to form a single tensioning system. In the embodiment shown in FIG. 2, the two tensioning devices 100 are powered by the same hydraulic system 250. The line exiting the master cylinder 252 splits into two separate lines, each one being fluidly connected to one of the tensioning devices 100. Alternatively, each tensioning and lock device 100 could have separate means to power its actuator 124.

In addition, a person skilled in the art would appreciate that suitable alternatives to a manually operated hydraulic system exist to power the actuator 124. That is, the actuator 124 can comprise any other suitable means for selectively extending and retracting the extension member or bar 122. These means include but are not limited to pneumatic devices or systems; mechanical devices or systems including but not limited to worm gear mechanisms, ratchet mechanisms, rack and pinion gear mechanisms; as well as other mechanical, hydraulic, pneumatic and electrical means.

In addition to supporting the extending mechanism 120, and in some instances a vertical support 110, the base 130 can serve as a mounting point for the tensioning and lock device 100. As shown in FIG. 1A, in at least one embodiment the base 130 engages a mounting plate 140, which can be installed on the base structure 300, such as a trailer or truck bed. The engagement of the base 130 with the mounting plate 140 may be a releasable engagement thereby allowing for quick and easily installation and removal of the tensioning and lock device 100 from the base structure 300.

Although the base 130 is depicted in the Figures as an elongate member, it is to be understood that the base 130 can take other shapes and forms, and may be much shorter and or smaller than depicted. This is particularly so where the tensioning device 100 does not comprise a vertical support 110. In such a configuration, the base 130 does not support a vertical support 110 and therefore need not have an elongate shape.

Figure 3:
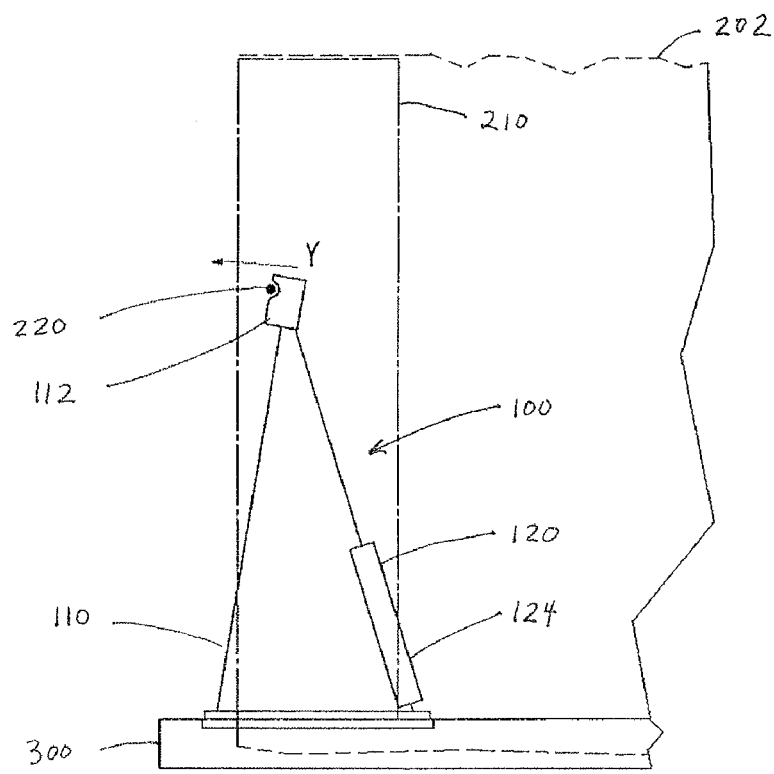
FIG. 3 is a sectional side view of a second embodiment of the cover tensioning device in the disengaged position.
Figure 4:
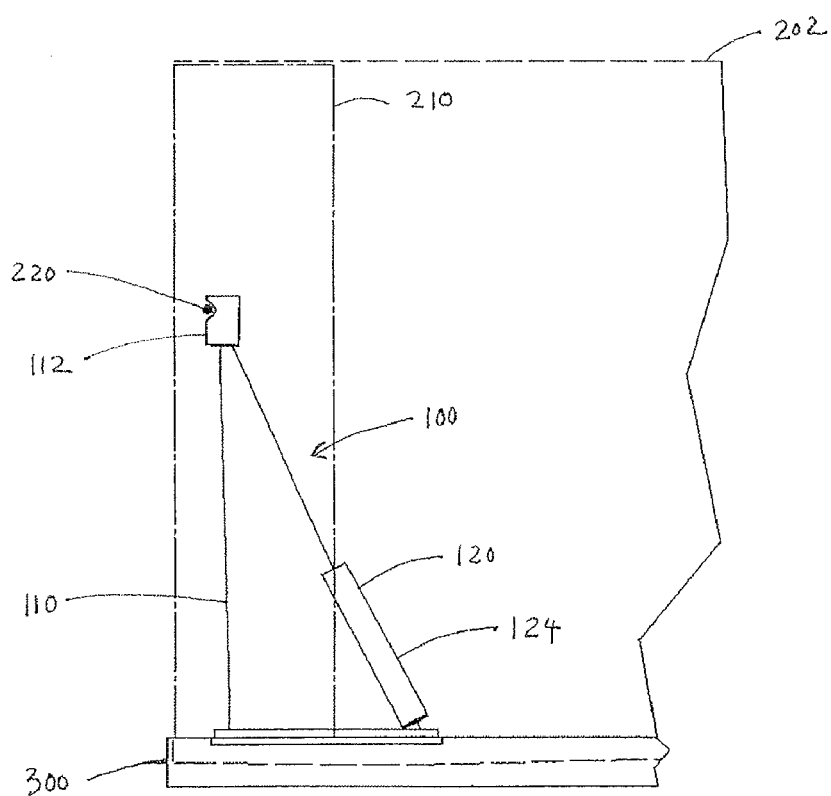
FIG. 4 is a sectional side view of a second embodiment of the cover tensioning device in the tensioned position.

The operation of the present cover tensioning device is now described. FIGS. 3 and 4 show the tensioning device 100 in two different stages of operation. FIG. 3 shows the tensioning device 100 in the disengaged position, whereas FIG. 4 shows it in the engaged, or tensioned, position. In FIG. 3, the rear bow 210 and thus the tarp cover 202 is not fully extended towards the rear of the base or trailer 300, and the extending mechanism 120 of the tensioning device 100 is in a retracted state. In operation, the engagement member 112 of the tensioning device 100 is positioned in contact with or in proximity to the pin 220 on the rear bow 210. The actuator 124 is then activated, thereby extending the bar 122 of the extending mechanism 120. As the extending mechanism 120 extends, it pivots the upper portion of vertical support 110, as well as the engagement member 112 connected to the upper end thereof, in the direction indicated by arrow Y. The force of the extending mechanism 120 is applied to the pin 220, and thus the bow 210, also in the direction of arrow Y. This force expands the cover 202 in the same direction, in this case towards the end of the base structure or trailer 300. Once the desired degree of tension in the cover 202 has been achieved, the actuator 124 is deactivated and the cover 202 is held in a tensioned and locked state. To release the tension in the cover 202, the actuator 124 is selectively activated to retract the bar 122.

The present cover tensioning device 100 has herein been described and illustrated as being disposed at the rear end of a base structure or trailer 300. However, it is to be understood that the tensioning device 100 can be positioned at various other suitable locations relative to a tarp cover system. For example, the device 100 can be installed at the front end of a base structure or trailer. Furthermore, one or more tensioning devices 100 can be positioned at opposite ends (e.g. front and rear) of a base structure or trailer 300.

The previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed:

1. A tensioning and lock device comprising:
a base;
an extending mechanism for applying a tensioning force to a tarp cover, the extending mechanism being pivotally connected to the base, the extending mechanism comprising a bar and an actuator for extending the bar;
a vertical support for supporting and guiding the extending mechanism, the vertical support being mechanically coupled to the extending mechanism and pivotally connected to the base; and
an engagement member for engaging a covering system, wherein the engagement member has an open notch engageable with a pin extending from a bow of said covering system.

2. A tensioning and lock device comprising:
a base;
an extending mechanism for applying a tensioning force to a tarp cover, the extending mechanism being pivotally connected to the base, the extending mechanism comprising a bar and an actuator for extending the bar;
a vertical support for supporting and guiding the extending mechanism, the vertical support being mechanically coupled to the extending mechanism and pivotally connected to the base; and
an engagement member for engaging a covering system, wherein the engagement member is located at the upper end of the extending mechanism.

3. The tensioning and lock device of claim 2, wherein the engagement member is pivotally connected to the extending mechanism.

4. The tensioning and lock device of claim 2, further comprising a mounting plate adapted to releasably engage the base, and further adapted to be installed on a trailer or truck bed.

5. The tensioning and lock device of claim 1, wherein the actuator comprises a hydraulic device.

6. The tensioning and lock device of claim 2, wherein the actuator comprises a hydraulic device.

7. The tensioning and lock device of claim 1, wherein the actuator comprises a pneumatic device.

8. The tensioning and lock device of claim 2, wherein the actuator comprises a pneumatic device.

* * * * *